Feb. 1, 1966
M. W. MILLER
3,232,769
METHOD OF PREPARING EGGS AND FOOD PRODUCTS
HAVING COOKED EGGS THEREIN
Filed Feb. 17, 1964
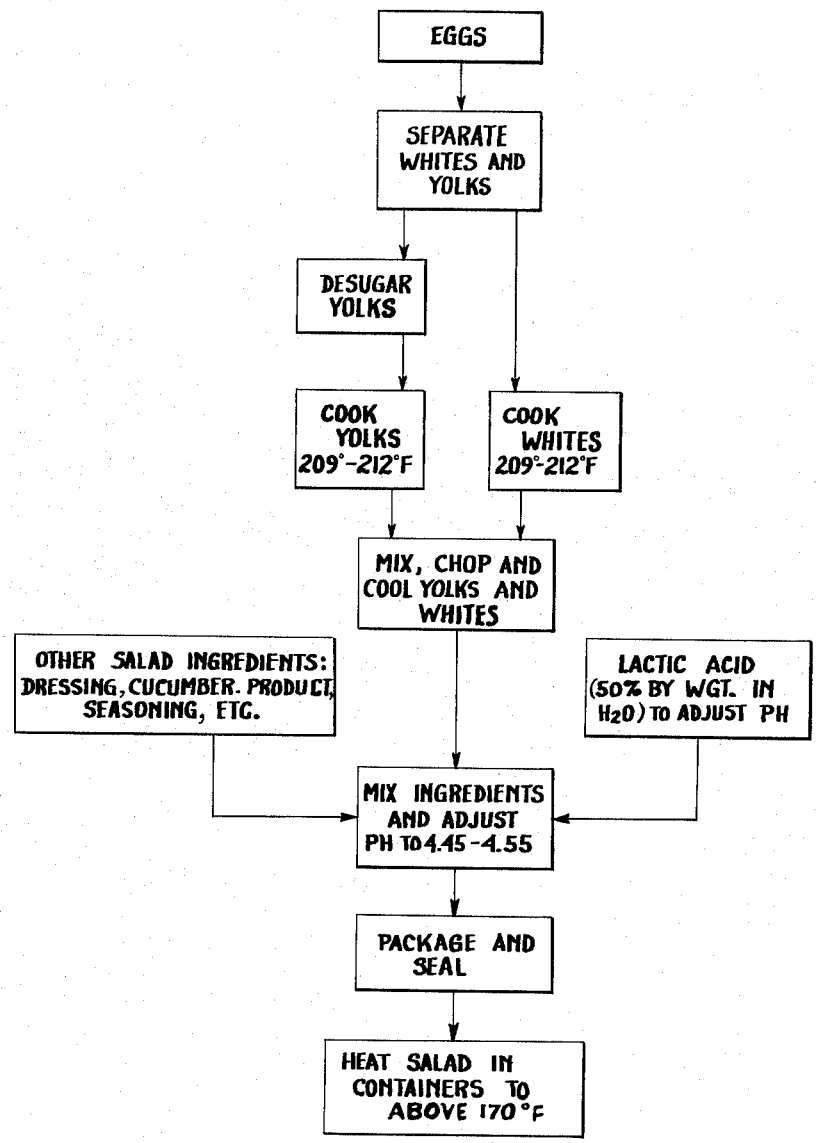
INVENTOR.
MELVIN W. MILLER
BY
ATTORNEYS

United States Patent Office 3,232,769
Patented Feb. 1, 1966

3,232,769
METHOD OF PREPARING EGGS AND FOOD PRODUCTS HAVING COOKED EGGS THEREIN
Melvin W. Miller, Seattle, Wash., assignor to Western Farmers Association, Seattle, Wash., a corporation of Washington
Filed Feb. 17, 1964, Ser. No. 345,314
14 Claims. (Cl. 99—182)

The present invention relates generally to the preparation of poultry eggs for use in various food products having cooked eggs therein and more particularly to an improved method of preparing food products having cooked eggs therein which is adaptable to large volume production techniques with the resulting food products being capable of being safely stored for an extended period of time without deterioration of the texture or appearance of the product.

It has long been the desire of the food industry to be able to produce on a large scale various products having cooked poultry eggs therein with the whites and yolks of the eggs retaining their individual characteristics of taste, texture, color, and general appearance. It has also been a desire of the food industry to produce such products having cooked eggs therein which are capable of long term storage without an impairment of the safeness of the product and without the usual loss of taste and general appearance of the cooked eggs. Generally the taste of such products as egg salad undergoes a change caused by long term storage and frequently the salad of stored for a period of time is rendered unfit for human consumption. In addition, it has been found that when egg salad or similar products are canned the eggs become tough and rubbery so that the product is generally not readily acceptable by the purchasing public. Heretofore there has not been known any process for making a product such as egg salad on a large scale with the salad having long storage life while retaining a good appearance.

It is therefore an object of the present invention to provide an improved method of preparing eggs on a commercial scale and in a manner such that the prepared eggs can be safely stored for a long period of time.

It is another object of the present invention to provide an improved process for making an edible product having cooked eggs therein.

It is a further object of the present invention to provide a novel process for making a cooked egg product on a large scale with the resulting product being capable of long term storage and which when used at a later time has the general characteristics of a freshly prepared product.

A further object of the present invention is to provide a process for making egg salad on a large scale and wherein the resulting product produced in accordance with the process can be stored for a long period of time without impairment of the taste, texture, or appearance of the cooked eggs in the product.

In accordance with the teachings of the present invention eggs are prepared using a process which includes separation of the whites and yolks of the eggs and then cooking the whites and yolks separately. The yolks are preferably desugared prior to cooking. After the whites and yolks have been cooked they are mixed, chopped, and cooled and then mixed with various other ingredients which may go into the product. The pH of the mixture is adjusted to a preselected value which has been found to prevent the growth of Clostridium organisms therein and thus subsequent heating of the product to a high temperature to kill the Clostridium organisms is not required. After the food product has been thoroughly mixed and the pH level adjusted to the proper value, it is placed in cans and sealed. Thereafter the temperature of the mixture in the sealed containers is elevated to a relatively high temperature and maintained at that temperature to eliminate any harmful organisms which might be present. The resulting product can then be stored for an extended period of time without spoilage and with the egg whites and yolks retaining the taste, appearance, and texture of freshly prepared eggs.

The above and other additional advantages and objects of the present invention will be more clearly understood from the following description and from the accompanying drawing wherein, FIGURE 1 is a flow diagram illustrating schematically the steps to be followed in carrying out one specific method of the present invention for producing a product such as egg salad.

In general the process in accordance with the teachings of the present invention involves the steps of: (1) separating the whites and yolks of eggs; (2) cooking the whites and yolks separately at a temperature of 209–212° F.; (3) mixing and chopping the whites and yolks and adding other ingredients if desired; (4) adjusting the pH of the mixture to a range of 4.45 to 4.55 (inclusive); (5) placing the mixture in containers and sealing the same; and (6) heating the mixture in the container to a temperature sufficient to destroy any harmful agents (approximately 170° to 190° F.).

More specifically there is illustrated in FIGURE 1 in block diagram form an embodiment of a process for preparing egg salad which includes the above stages and also, among other things, desugaring of the egg yolks to enhance the flavor of the resulting product. In accordance with this specific embodiment the yolks and whites are first separated by the use of a commercially available separator and then cooked separately. Prior to cooking of the yolks, however, they are desugared in accordance with one of the techniques well known in the art. One such technique includes heating the yolks to a temperature of approximately 100° F. and holding them at this temperature until there is no trace of glucose therein. Any one of a number of commercially available dextrose sensitive test papers can be used to test for the presence of sugar in the yolks. Two hundred to three hundred milliliters of a glucose oxidase-catalase enzyme system is added per one thousand pounds of the liquid yolks in the desugaring process. A glucose oxidase-catalase enzyme system such as that referred to as DeeO manufactured and sold with instructions for use by the Miles Chemical Company of Indiana is found to work well in the desugaring process. The yolks are gently agitated during the process and at thirty minute intervals over a period of three and one-half hours 35% hydrogen peroxide in a water solution is added at the rate of 1,769 milliliters per thousand pounds of yolks.

The desugared yolks and the whites are then cooked separately at an appropriate temperature and for a sufficient time to insure thorough cooking thereof. The time and temperature is such that the material does not become "rubbery." It has been found that if the yolks and the whites are cooked at a temperature of from 209° F. to 212° F. (using steam) for approximately 1.75 minutes the desired texture is obtained. The cooked yolks and whites are then mixed and ground to a suitable size for use in the salad and either simultaneously or later the temperature of the cooked eggs is reduced to approximately 110° F. As a result of this cooling the white and yolks, physical breakdown of the salad dressing used in maufacturing the egg salad is avoided.

The chopped egg is then placed in a large vat and mixed with the various other ingredients which are used in the particular product being produced. In one type of egg salad produced in accordance with the teachings of the invention a cucumber product such as relish or chopped pickles as well as various spices and seasoning agents such as salt, pepper, and sugar are mixed with the chopped yolks and whites. Any one of a number of salad dressings suitable for use in the product is added at this time also. One specific commercial dressing used is composed of starch, sugar, flour, water, vinegar, yolk, salt, seasoning, and oils. The pH level of the mixture is adjusted by the addition of sufficient acid such as a solution of 50% by weight of lactic acid in water to bring the pH to a value which has been found to prevent the growth of Clostridium organisms and thus permit long term storage. The pH level is preferably adjusted to a value in the range of 4.45 to 4.55. It is found that with the pH level adjusted in this range the growth of Clostridium organisms is prevented and a long shelf life achieved.

The mixture is then placed in suitable containers such as metallic cans and sealed, after which the mixture is then heated in the containers to a temperature sufficiently high to prevent fermentation and to kill any pathogenic organisms such as salmonella which might be present. The temperature is held below the point where the eggs become tough and rubbery, since in general the higher the temperature the greater is the tendency for the eggs to become tough and rubbery. Normally a temperature of 212° F. for several minutes will suffice to kill Clostridium organisms and prevent the associated generation of toxins. However, in the present method such high temperatures are not required since the pH level previously established in the mixture effectively prevents the growth of Clostridium organisms in the containers and hence a lower final processing temperature is inadequate. A temperature of 170° F. has been found to be adequate to kill Salmonella, and yet is sufficiently low as to not impair the texture of the eggs. I have also found that a temperature of 190° F. will not materially affect the texture of the eggs and therefore immersing the sealed containers in 200° F. water until the temperature of the salad in the containers reaches 190° F. is a preferred manner of carrying out the final step in the process.

By using the above described techniques a safe food product which includes cooked eggs can be prepared on a commercial basis with the product having a long shelf life in terms of flavor, safety, appearance, and texture.

What is claimed is:

1. A method of preparing poultry eggs comprising the steps of cooking the whites and yolks of the eggs separately, mixing the cooked whites and yolks, adjusting the pH of the mixed whites and yolks to within a range of 4.45 to 4.55, sealing the mixture of whites and yolks in containers, and heating the contents of the sealed containers to a temperature of at least 170° F.

2. The method of claim 1 wherein the pH of the whites and yolks is adjusted by the addition of lactic acid thereto.

3. The method of claim 1 wherein said yolks are desugared prior to cooking.

4. A method of preparing a food product having cooked eggs therein comprising the steps of: separating the whites and yolks of the eggs; cooking the whites and yolks separately; mixing the yolks and whites with other foods including seasoning to form a food mixture; adjusting the pH of the mixture to within the range of 4.45 to 4.55; placing the mixture in containers and sealing the containers; and heating the mixture in the containers to a temperature greater than 170° F.

5. The method in accordance with claim 4 wherein said yolks are desugared prior to cooking thereof.

6. The method in accordance with claim 5 wherein the yolks and whites are cooked at a temperature of from 209° to 212° F. and wherein the pH of the mixture is adjusted by the addition of lactic acid.

7. The method of claim 4 wherein the cooked whites and yolks are cooled to a temperature of at least 110° F. prior to addition of said other foods and wherein one of said other foods is a salad dressing.

8. A method of preparing egg salad suited for storage comprising: separating the whites and yolks of eggs; desugaring the yolks; cooking the yolks and whites separately at a temperature of from 209° to 212° F.; mixing, chopping and cooling the cooked yolks and whites; adding to the yolks and whites other salad ingredients including salad dressing and seasoning to form an egg salad mixture; adding sufficient lactic acid to the mixture to adjust the pH thereof to within a range of 4.45 to 4.55; sealing the mixture in an airtight container; and heating the mixture in the container to a temperature of between 170° F. and 190° F., inclusive.

9. The method of claim 8 wherein the whites and yolks are cooked at a temperature of from 209° F. to 212° F. for 1.75 minutes.

10. A method of preparing a food product comprising the steps of preparing a mixture which includes cooked egg whites and cooked egg yolks and adjusting the pH of the mixture to a level sufficiently below neutral to prevent the growth of Clostridium organisms therein, and heating the mixture to a temperature sufficiently high to destroy Salmonella.

11. The method in accordance with claim 10 wherein the pH of the mixture is adjusted to the range of 4.45 to 4.55 and wherein the mixture is placed in a sealed container prior to said heating thereof.

12. The method in accordance with claim 10 wherein the temperature to which the mixture is heated is between 170° F. and 190° F., whereby Salmonella is destroyed without the eggs becoming rubbery.

13. A method of preparing a preserved poultry egg product comprising the steps of cooking egg whites and desugared egg yolks at a temperature below 212° F. to solidify the same; mixing the cooked whites and yolks with other food ingredients including a sufficient quantity of a pH adjusting ingredient to establish the pH of the mixture at a value sufficiently below neutral value to prevent the growth of Clostridium organisms, and heating the mixture to a temperature which is sufficiently high to destroy Salmonella but which is lower than 200° F. to thereby prevent the eggs from becoming rubbery.

14. The method in accordance with claim 13 wherein the adjusted pH value is in the range of substantially 4.45 to 4.55 and wherein the heating temperature is within the range substantially of 170° F. and 200° F.

References Cited by the Examiner
UNITED STATES PATENTS 2,593,223   4/1952   Trelease et al. _____ 99—161
3,166,424   1/1965   Stewart et al. _____ 99—182

A. LOUIS MONACELL, *Primary Examiner.*